(12) United States Patent
Claypool

(10) Patent No.: US 7,014,329 B2
(45) Date of Patent: Mar. 21, 2006

(54) PARABOLIC REFLECTOR

(76) Inventor: James P. Claypool, Hillcrest Terrace 624 3rd St. SW., Chisholm, MN (US) 55719

( * ) Notice: Subject to any disclaimer, the term of this patent is extended or adjusted under 35 U.S.C. 154(b) by 0 days.

(21) Appl. No.: 10/860,895

(22) Filed: Jun. 4, 2004

(65) Prior Publication Data

US 2005/0270673 A1    Dec. 8, 2005

(51) Int. Cl.
G02B 5/10    (2006.01)
(52) U.S. Cl. .................................... 359/853
(58) Field of Classification Search ........ 359/850–853, 359/855
See application file for complete search history.

(56) References Cited

U.S. PATENT DOCUMENTS

| | | | |
|---|---|---|---|
| 3,337,871 A * | 8/1967 | Greenberg et al. .......... | 359/851 |
| 3,715,760 A * | 2/1973 | Palmer ....................... | 343/915 |
| 4,862,190 A | 8/1989 | Palmer et al. .............. | 343/915 |
| 5,104,211 A | 4/1992 | Schumacher et al. ....... | 359/853 |
| 5,198,832 A * | 3/1993 | Higgins et al. ............. | 343/915 |
| 5,865,905 A | 2/1999 | Clemens ..................... | 136/245 |
| 6,104,358 A | 8/2000 | Parker et al. ............... | 343/915 |

* cited by examiner

*Primary Examiner*—Euncha P. Cherry
(74) *Attorney, Agent, or Firm*—Nikolai & Mersereau, P.A.

(57) ABSTRACT

For camping trips and other activities it is useful to have a solar reflector for cooking or electricity generation. It can be made form a flat piece of material and folded into a three dimensional parabolic dish for concentrating solar radiation. The flat disk has a plurality of spirally cut segments, which can overlap when the segments are made to stand extending in a parabolic shape from their central circular base. The segments will overlap on their edges and can be fastened together near the circumference to form a parabolic dish for reflecting solar rays toward a central area used for cooking. The parabolic reflective dish can be disassembled and stored flat by removing the fasteners and urging the spiral side segments to lie flat. The number of spiral side segments and their size may vary. The parabolic reflector is easy to assemble and disassemble and easy to carry.

4 Claims, 6 Drawing Sheets

PARABOLIC REFLECTOR

BACKGROUND OF THE INVENTION

1. Field of the Invention

This invention relates to parabolic reflectors that can be used for heating, photoelectric power generation or as a transmitting/receiving antenna for microwave communications.

2. Description of the Related Art

Reflective parabolic dishes have been used to reflect the suns rays onto a point in front of the dish for heating, cooking food, photoelectric power generation and for other uses. However, prior parabolic reflectors were not made from a low cost sheet of reflective material by making a few cuts in the material and folding the material into a parabolic reflector. The parabolic reflectors of the present invention are easy to assemble low cost devices made from a flat sheet of reflective material.

SUMMARY OF THE INVENTION

A parabolic reflector which can be easily made from a flat circular disk and assembled into a parabolic reflector with overlapping spiral side segments and a flat circular base. The parabolic reflector can be used on camping trips to focus sunlight for heating, cooking food or generating electricity. Also, the technology can be applied to line of site microwave communication systems. Alternatively, the spiral cuts can be made such that the side segments fit together along a seam without overlapping.

The parabolic reflector comprises a flat circular disk having a central circular base with spiral cuts, starting at a tangent to the circle, and radiating therefrom. The spiral cuts extend from the central circular base to the circumference of the flat circular disk. The material of the flat circular disk should have a reflective surface for reflecting the suns rays. The material should be strong enough to hold a shape and flexible enough to let the spiral side segments bend from a flat configuration to a curved configuration, such that the spiral segments can form the sidewalls of the parabolic reflector.

The spiral side segments will be side by side when the parabolic reflector is flat. When the parabolic reflector is folded into its parabolic shape the spiral side segments will overlap and can be fastened together or alternatively the segments can fir together without overlapping.

OBJECTS OF THE INVENTION

It is an object of the invention to fashion a parabolic reflector from a flat circular sheet of reflective material.

It is an object of the invention to store the parabolic reflector flat.

It is an object of the invention to have a lightweight easy to set up parabolic reflector for solar cooking and other applications.

Other objects, advantages and novel features of the present invention will become apparent from the following detailed description of the invention when considered in conjunction with the accompanying drawing.

DESCRIPTION OF THE PREFERRED EMBODIMENTS

Figure 1:
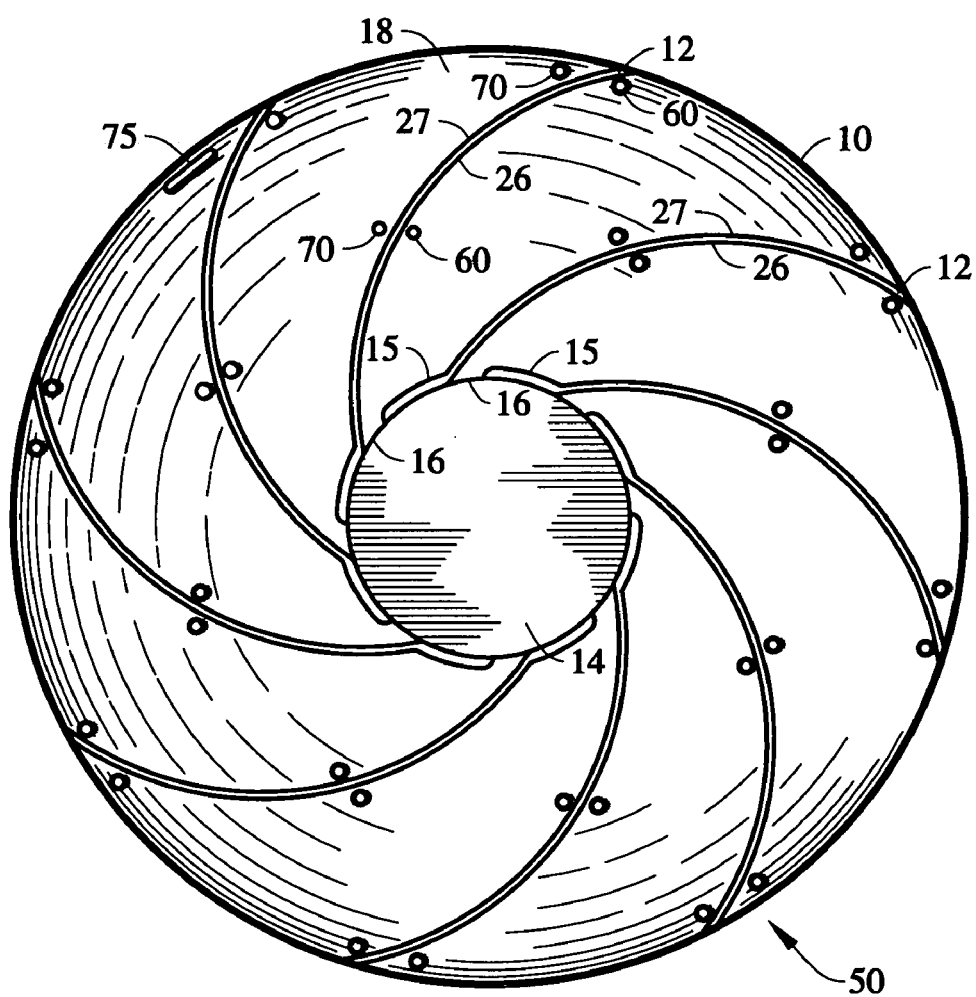
FIG. 1 is a top view of the parabolic reflector when it is flattened.

FIG. 1 is a top view of the parabolic reflector when it is lying in a plane. The parabolic reflector starts as a flat circular disk 50 having a circumference 10. The parabolic reflector has circular base portion 14 and a plurality of spiral cuts 12 starting from the circumference 16 of the circular base portion 14 and extending to the circumference 10 of the flat circular disk 50. The spiral cut 12 preferably starts at a tangent to the circular base portion 14. Preferably there are segments 15 cut out along the circumference 16 of base portion 14 so that it is easier to bend the spiral side segments 18 upward relative to the circular base portion 14. The plurality of spiral cuts 12 divide the flat circular disk 50 into spiral side segments 18. Each spiral side segment 18 has a front edge 26 and a back edge 27. The spiral side segments 18 and the flat circular base 14 have a reflective surface material for reflecting solar radiation or microwave energy. The parabolic reflector material should be flexible so that it can be bent into an approximation of a parabolic dish. A thin sheet of metal such as aluminum with a reflective surface will work as the material for the parabolic reflector. The spiral side segments 18 may employ a reflective coating such as a plastic film, which is highly reflective.

Figure 2:
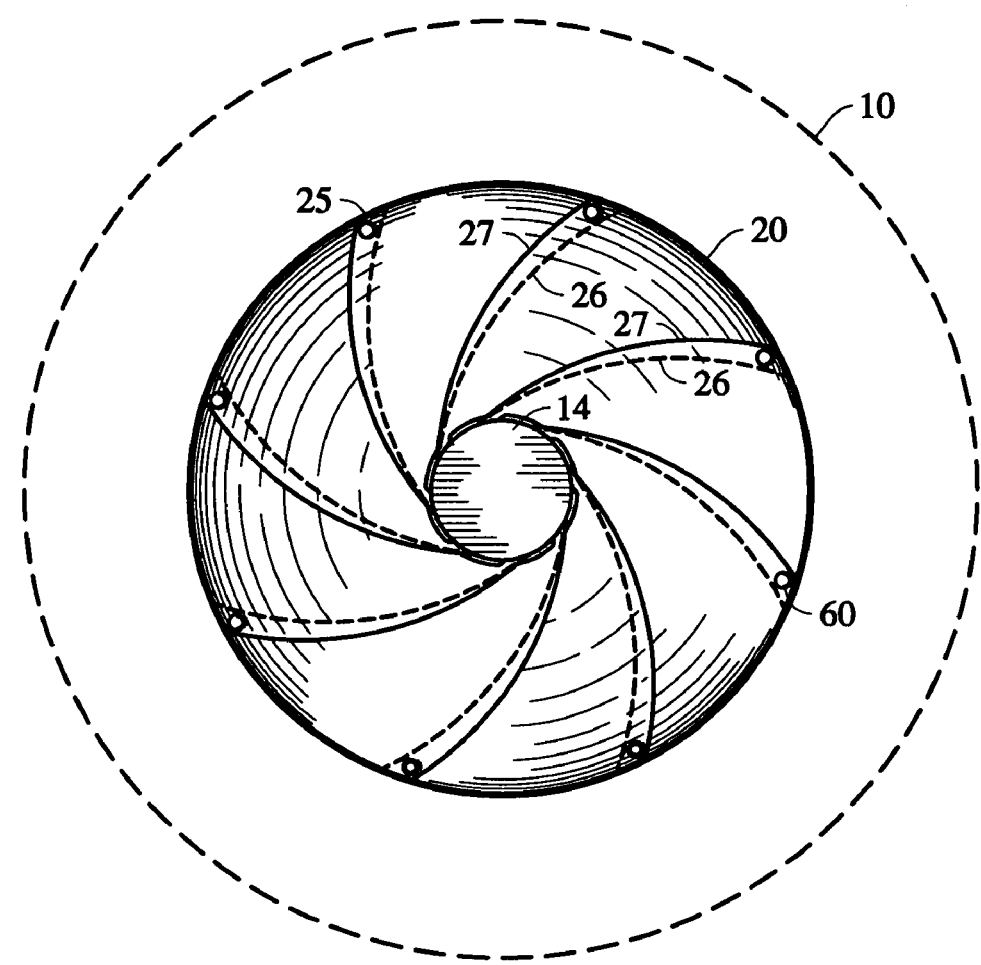
FIG. 2 is a top view of the parabolic reflector when it is folded.

FIG. 2 shows a top view of the parabolic reflector. The dashed line shows the circumference 10 of the flattened parabolic reflector. When the spiral side segments 18 are bent upwards to form a bowl like parabolic reflective dish the circumference shrinks to the parabolic reflector circumference 20. The spiral side segments 18 over lap as shown by overlapping portion 25. The front edge 26 of each spiral side segment 18 overlaps the back edge 27 of the adjacent spiral side segment 18, while the flat circular base 14 remains flat at the center of the parabolic solar reflector.

In order to secure the parabolic reflector so it will stay in the dish like shape apertures 60 and 70 near the front edge 26 and rear edge 27 respectively of the spiral side segments 18 can receive fasteners such as screws or rivets to hold the segments in place. The parabolic solar reflector is shown in cross section in FIG. 3 having the flat circular base portion 14 and spiral side segments 18 forming a parabolic reflector for reflecting solar rays 30 into a focal area 40 which can be used for heating food. The focal area 40 can also have pipes for heating a fluid herein or have photoelectric cells for generating electricity. The focal area 40 may alternatively contain a microwave transceiver antennas.

The parabolic reflector can have a reflective material 28 such as a plastic film on the surface of the spiral side segments 18.

The parabolic reflector can be easily disassembled after each use by removing the fasteners from apertures 60 and 70. The parabolic solar reflector can then be flattened and stored for future use.

The parabolic reflector in the figures is shown with eight spiral side segments 18 however ten, or twelve segments can readily be used. The number of segments used is related to the size of the parabolic dish used.

The focal length of the parabolic reflector can vary by the length of the spiral side segments 18 and the curvature thereof. The focal length also varies with the radius of the flat circular base 14.

The apertures 60 and 70 may be placed in different locations or there may be multiple apertures for overlapping the spiral side segments in different places. The apertures 60 and or 70 may also be slots 75 for slidably adjusting the position of the overlapping spiral side segments 18.

Figure 3:
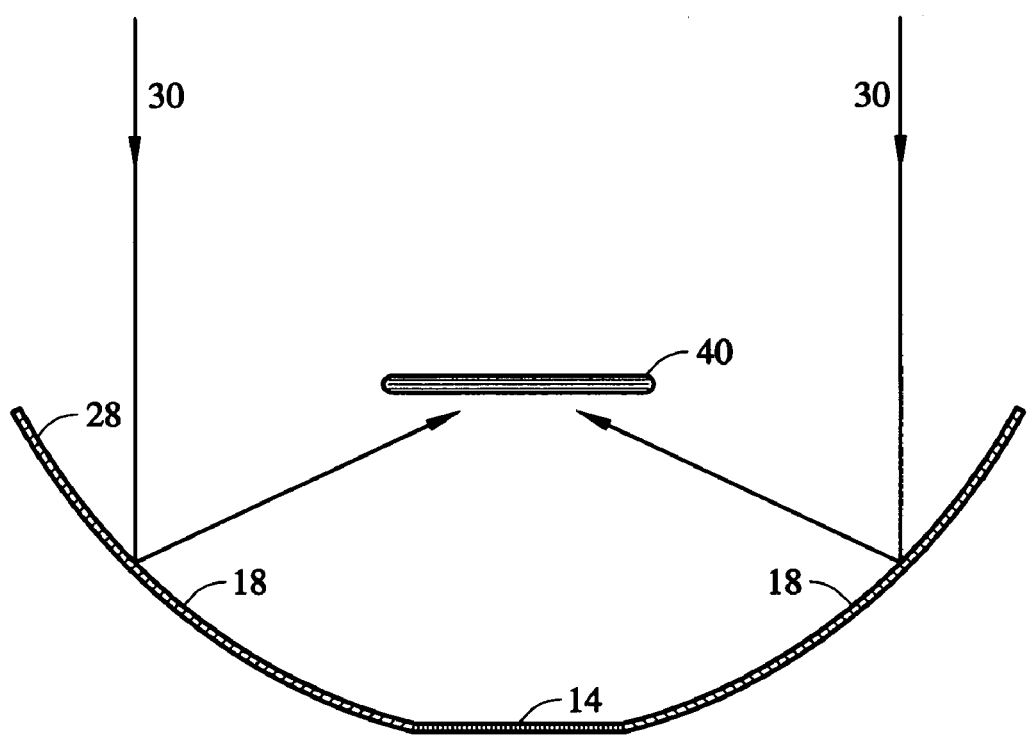
FIG. 3 is a side cross sectional view of the parabolic reflector when it is folded.

Once assembled the parabolic reflectors of FIG. 3 can be nested one inside the other for shipping or storage.

Figure 4:
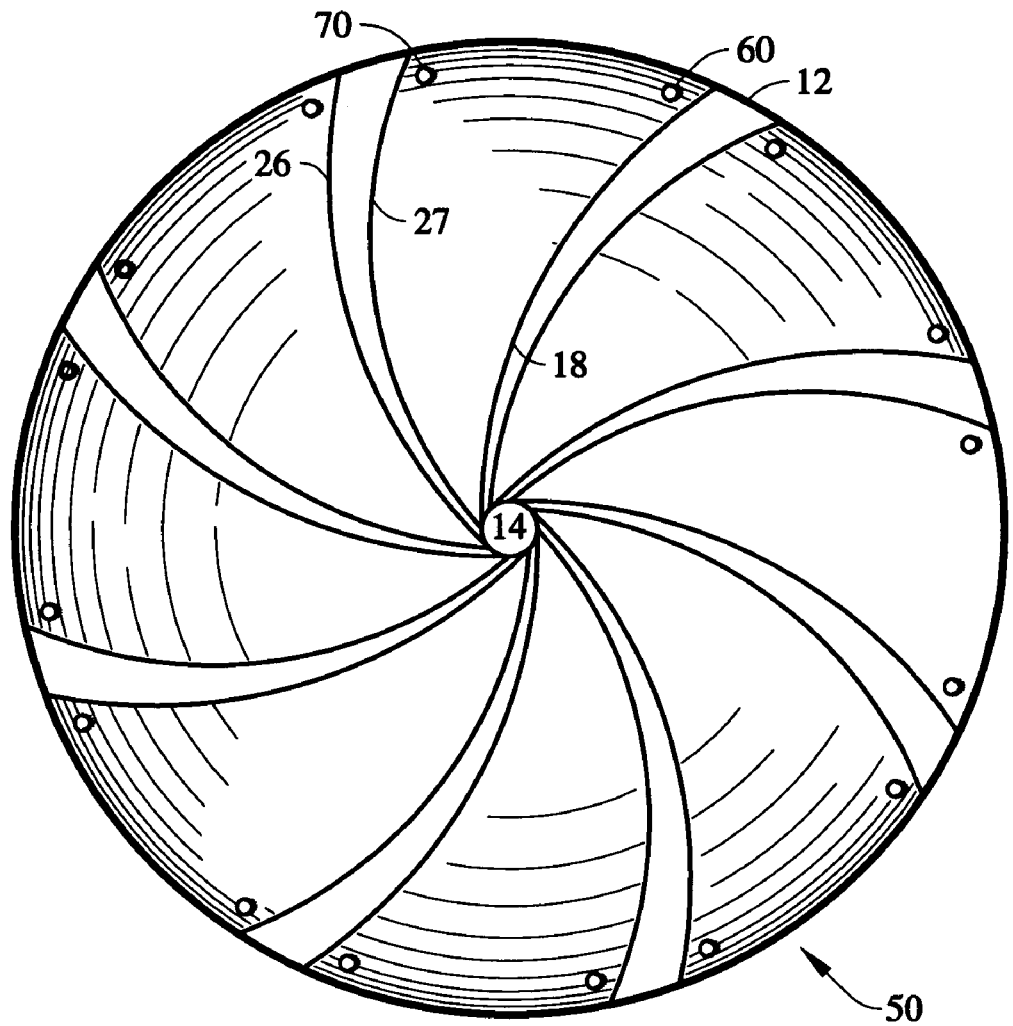
FIG. 4 is a top view of the parabolic reflector of a second embodiment when it is flattened
Figure 5:
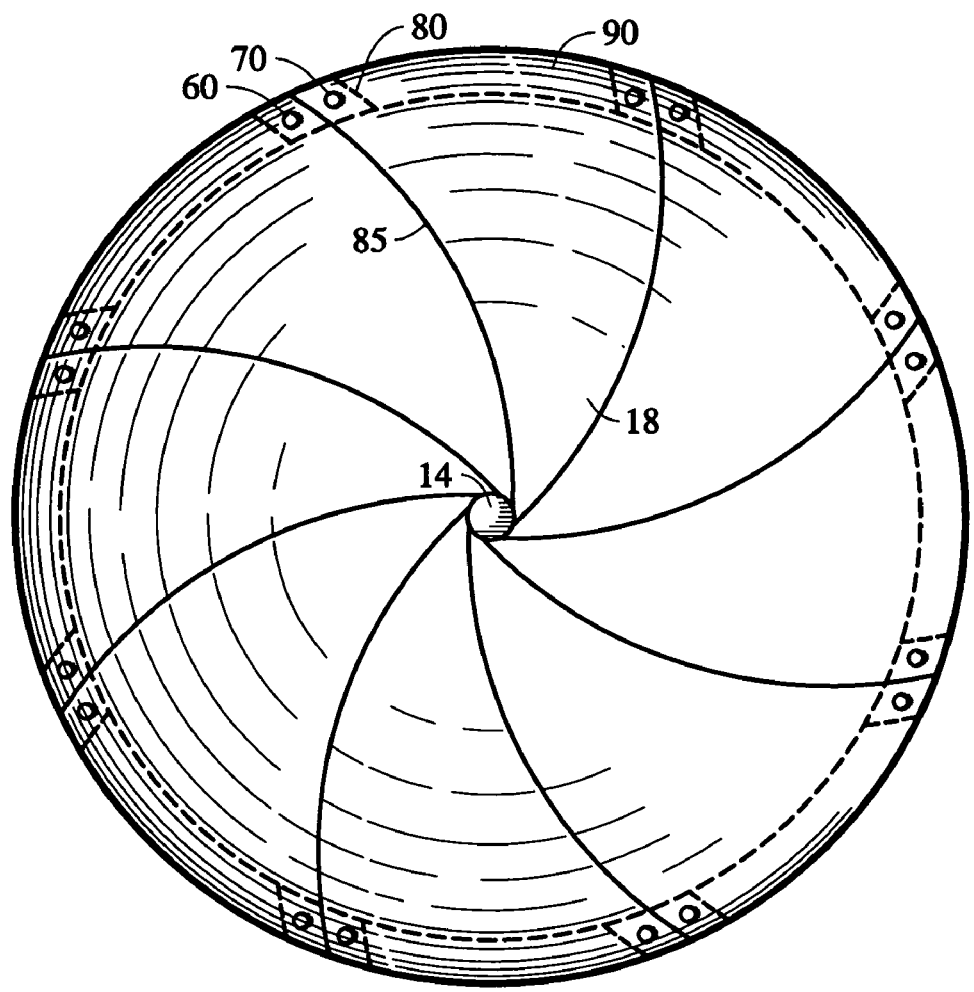
FIG. 5 is a top view of the parabolic reflector of a second embodiment when it is folded.
Figure 6:
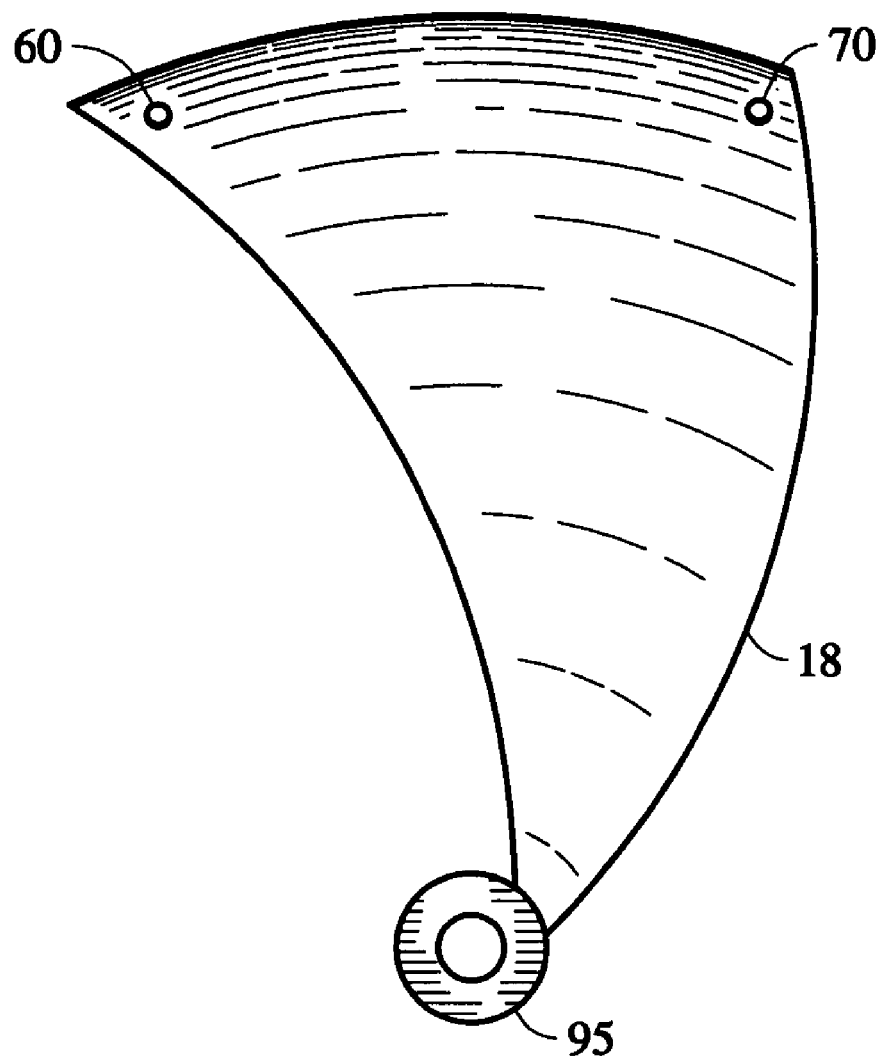
FIG. 6 is a top view of a spiral side segment having a ring.

In a second embodiment shown in FIGS. 4 and 5 the flat circular base 14 can be very small or be an axel. The spiral cuts 12 are made larger between the spiral side segments 18 such that when the spiral side segments 18 are folded into the parabolic reflector the front and back edges 26 and 27 form a seam 85. The parabolic reflector is more efficiently aligning the reflected rays since the spiral side segments 18 do not overlap, thus forming a closer approximation to a parabola. Similarly the smaller flat circular base 14 also adds to the closer approximation to a parabola.

When the flat circular base 14 is small the spiral side segments 18 do not need to have segments 15 cut therefrom since the attachment line between the circular base 14 and the spiral side segment 12 will be short and easily bendable.

The parabolic reflector in the second embodiment has apertures 60 and 70 in the spiral side segments 18. A tab 80 having apertures aligned with apertures 60 and 70 can be used to fasten the spiral side segments 18 together. Alternatively a hoop 90 having apertures aligned with apertures 60 and 70 in the spiral side segments 18 can be used to form the spiral side segments 18 into a parabolic shape.

If the flat circular base in the second embodiment is an axel the spiral side segments 18 have ring portions 95 for fitting onto the axel 14. The spiral side segments can then be made as separate pieces and then assembled or disassembled into a parabolic reflector.

In all embodiments the spiral cuts 12 can be circular or have other curved parameters.

The parabolic reflector is easy to manufacture, low cost, and disposable if the reflective surface becomes damaged, loses its shape or is otherwise compromised.

Obviously, many modifications and variations of the present invention are possible in light of the above teachings. It is therefore to be understood that, within the scope of the appended claims, the invention may be practiced otherwise than as specifically described.

I claim:

1. A foldable solar reflector comprising:
   a circular flat sheet of reflective material having a circular base portion in the center, and a plurality of spiral side segments formed by making spiral cuts from the circular base to the circumference of the circular flat sheet,
   a plurality of apertures along the sides of the spiral cuts on each spiral side segment,
   fasteners for inserting into the apertures in the spiral cuts on each spiral side segment for connecting spiral side segments to hold the solar reflector in a parabolic shape.

2. A foldable solar reflector as in claim 1 wherein, the spiral side segments overlap and the fasteners extend though aligned apertures therein.

3. A foldable solar reflector as in claim 1 wherein, a hoop extends around the circumference of the parabolic reflector and the fasteners extent through apertures in the hoop aligned with apertures in the spiral side segments without the spiral side segments overlapping.

4. A foldable solar reflector as in claim 1 wherein, a segment is cut along the circumference of the circular base portion to separate a portion the circular base portion from the base of the spiral side segments to make it easier to bend the spiral side segment relative to the circular base portion.

* * * * *